(12) United States Patent
Hirvonen et al.

(10) Patent No.: US 7,305,241 B2
(45) Date of Patent: Dec. 4, 2007

(54) METHOD FOR MANAGING RADIO RESOURCES AND RADIO SYSTEM

(75) Inventors: Heikki Hirvonen, Tampere (FI); Martti Tuulos, Tampere (FI)

(73) Assignee: Nokia Corporation, Espoo (FI)

( * ) Notice: Subject to any disclaimer, the term of this patent is extended or adjusted under 35 U.S.C. 154(b) by 438 days.

(21) Appl. No.: 10/528,080

(22) PCT Filed: Sep. 18, 2002

(86) PCT No.: PCT/FI02/00742

§ 371 (c)(1),
(2), (4) Date: Mar. 15, 2005

(87) PCT Pub. No.: WO2004/028181

PCT Pub. Date: Apr. 1, 2004

(65) Prior Publication Data

US 2006/0111118 A1    May 25, 2006

(51) Int. Cl.
 *H04Q 7/20* (2006.01)
(52) U.S. Cl. .................... 455/453; 455/450; 455/445; 455/560; 455/442; 370/338; 370/395.2
(58) Field of Classification Search ........ 455/436–442, 455/450–453, 560, 428, 509, 517, 524–525; 370/310, 352, 328–335, 395.52, 386, 395.2, 370/395.21; 379/111, 112.01, 112.04, 114.07, 379/114.08
See application file for complete search history.

(56) References Cited

U.S. PATENT DOCUMENTS 5,678,178 A * 10/1997 Tahkokorpi ............... 455/452.1
5,844,886 A   12/1998 Szentesi
6,445,924 B1 * 9/2002 Rasanen .................... 455/437
6,671,512 B2 * 12/2003 Laakso ...................... 455/453

(Continued)

FOREIGN PATENT DOCUMENTS

EP    1 418 782 A1 *  5/2004

(Continued)

OTHER PUBLICATIONS

Tolli et al, "Performance Evaluation of Common Radio Resource Management (CRRM)." IEEE International Conference on Communications. 2002, Apr. 28-May 2, 2002, vol. 5, pp. 3429-3433.

Primary Examiner—George Eng
Assistant Examiner—Kamran Afshar
(74) Attorney, Agent, or Firm—Squire, Sanders & Dempsey L.L.P.

(57) ABSTRACT

The invention relates to a radio system and a method for managing radio resources in a radio system. The method comprises receiving radio capacity information of the radio cell, receiving transport capacity information on transport network, the transport network being used for connecting the base stations of the radio network to a core network. The method further comprises determining a transport capacity limit for the radio cell based on the transport capacity information; signalling the transport capacity limit of the radio cell to the base station; adjusting in the base station the radio capacity information based on the transport capacity limit; signalling from the base station the adjusted radio capacity information on the radio cell; and managing radio resources of the radio network by using the signaled adjusted radio capacity information on the radio cell.

27 Claims, 4 Drawing Sheets

U.S. PATENT DOCUMENTS

| | | | |
|---|---|---|---|
| 6,760,303 B1 * | 7/2004 | Brouwer | 370/229 |
| 6,968,192 B2 * | 11/2005 | Longoni | 455/453 |
| 2003/0171123 A1 * | 9/2003 | Laakso et al. | 455/453 |
| 2004/0076179 A1 * | 4/2004 | Kaminski et al. | 370/466 |
| 2004/0132486 A1 * | 7/2004 | Halonen et al. | 455/552.1 |
| 2005/0044130 A1 * | 2/2005 | Sillasto et al. | 709/200 |
| 2005/0094560 A1 * | 5/2005 | Montes Linares | 370/230 |

FOREIGN PATENT DOCUMENTS

| | | |
|---|---|---|
| WO | WO 02/32174 | 4/2002 |
| WO | WO 03/081935 | 10/2003 |

* cited by examiner

METHOD FOR MANAGING RADIO RESOURCES AND RADIO SYSTEM

CROSS-REFERENCED APPLICATIONS

This application is a national stage application filed under 35 USC § 371 of International Application number PCT/FI2002/000742, filed on Sep. 18, 2002.

FIELD

The invention relates to a method for managing radio resources in a radio system and a radio system.

BACKGROUND

The amount of users and the density of mobile equipment are further increasing together with the rising need for transferring large amounts of information over wireless communications systems. This causes increasingly tightening demands and requirements for the capacity of mobile communication systems.

It has been proposed that instead of just one type of radio access technology, future wireless communication networks should be using several types of radio access technologies, such as WCDMA (Wideband Code Division Multiple Access), GSM/EDGE (Global System for Mobile Communication/Enhanced Data Rates for Global Evolution) or the like. With the use of different technologies, the network as a whole can take advantage of coverage and capacity characteristics of the different technologies. This causes new demands for the management of network resources. A critical demand will be the managing quality of service (QoS) in a network without wasting resources.

In the near future, wireless communication networks and wireless user equipment will more and more support Internet protocol (IP) based technologies. In most of the fixed networks, the amount of IP traffic has already exceeded that of circuit switched traffic. It also has been proposed that when IP traffic begins to dominate radio access networks (RAN) network layers can be removed and costs reduced by native IP handling.

Managing radio resources is a critical task for future communication networks, especially for communication networks using packet switched transport networks with a routing function, e.g. IP packet based transport networks. IP packet based transport exploits one of the very basic features of IP packets: when user data is packetized by means of IP, an IP packet comprises the information about the packet's destination together with its origin, which makes the packet easily routable. This makes the IP packet very tolerant for network failures or constant topology changes, problems that in other types of networks are usually solved by external logic, such as protection and management systems. The length of the IP packet is variable, which makes it easy to adapt to various types of signalling and user data.

When data is put into IP packet form, the destination address causes specific routing decisions in routers, through which the packet travels on route to its destination. In circuit switched networks, the content is unaware of its destination, and the network signals the connection. Network capacity is reserved by the signaled connection as long as the connection lasts. In packet networks, user data is sent over a specific link and several consequent packets can share the same connection.

Routing was originally designed for file transfer, so it is naturally optimized for that purpose. The above described routing performs well also for real time traffic, such as voice and videotelephony, as long as there is enough network capacity available and the quality of service (QoS) is taken care of.

Problems arise when the communication network is congested, e.g. part of the communication network becomes overloaded. Congestion can occur if, for example, the routers or other network elements receive data faster than the data can be forwarded from the router. If the traffic is allowed to flow freely to the IP transport of the mobile network, like on the Internet, especially the thin transport part close to the base stations may become congested.

In prior art it has been suggested that, when destination routes are congested, data packets are either drop or put on hold, depending for example on the router's capabilities. Packets being queued at buffers in the communication system can be dropped to make room for arriving packets. New packets can be prevented from entering the congested part of the communication system until room for new data is made. However, these techniques cause problems, such as dropped data or delay, and variation of delay that degrade the quality of service and that therefore are unwanted especially in real-time telecommunication services.

From the coverage point of view, it may be necessary to build more radio capacity than there is transport capacity on those links close to the base stations. The problem is that this may even increase the possibility of ending up in a congested situation where e.g. handover from one cell to another would be sensible from the radio point of view but not from the transport point of view. Congestion may be further increased by link failures, which lower the transport capacity.

The data congestion problem is also introduced in a previous application (PCT/IB02/00919) of the applicant. In the application, the problem is solved by data routing: a congested portion of a communication system is identified, and data throughput in the congested portion is reduced by routing data via a selected base station. The application describes an IP transport Resource Manager (ITRM) which manages the transport control, e.g. the quality of service (QoS) in the transport network, by monitoring the IP data flow through the transmission network, and which receives measurements from various elements of the network, indicating, among other things, traffic congestion. An entity called a common resource management server (CRMS) is also described in the application, the CRMS being responsible for the management of radio resource control. The CRMS receives periodical load and QoS measurements from each radio cell of the radio network and acts as an advisor to an entity responsible for the radio network control functions of the radio access network in question. The previous application introduces a way to pass information between the ITMR and the CMRS using messages from the ITMR to the CMRS.

BRIEF DESCRIPTION OF THE INVENTION

An object of the invention is to provide an improved method for managing radio resources in a radio system. This is achieved by a method for managing radio resources in a radio system, the radio resources being used for providing a radio connection between user equipment and a radio cell of a base station in a radio network of the radio system, the method comprising: receiving radio capacity information on the radio cell, receiving transport capacity information on a transport network, the transport network being used for connecting the base stations of the radio network to a core network, and determining a transport capacity limit for the radio cell based on the transport capacity information, signalling the transport capacity limit of the radio cell to the base station, adjusting, in the base station, the radio capacity information based on the transport capacity limit, signalling from the base station the adjusted radio capacity information on the radio cell, and managing radio resources of the radio network by using the signalled adjusted radio capacity information on the radio cell.

The invention also relates to a radio system, comprising: at least one radio network, the radio network comprising at least one base station for providing user equipment with a radio cell for radio transmission and reception, a transport network for providing the base stations of the radio network with a connection to a core network of the radio system, a radio resource management unit for managing the radio resources between the base stations and the user equipment in the radio network, configured to receive radio capacity information on the radio cell, a transport resource management unit for managing the transport network resources, configured to receive transport capacity information on the transport network; and the transport resource management unit is configured to determine a transport capacity limit for a radio cell based on the transport capacity information, the transport resource management unit is configured to signal the transport capacity limit of the radio cell to the base station, the base station is configured to adjust the radio capacity information on the radio cell based on the transport capacity limit, the base station is configured to signal the adjusted radio capacity information on the radio cell to the radio resource management unit to be used in managing radio resources, the radio resource management unit is configured to manage radio resources of the radio network by using the signalled adjusted radio capacity information on the radio cell.

Preferred embodiments of the invention are disclosed in the dependent claims.

The method and system of the invention provide several advantages. The invention makes it possible for the radio system to take the transport load situation into account when managing the radio resources of the radio system, e.g. when performing handovers, selecting a target sell or tuning the cell camping behaviour of mobiles. In an embodiment of the invention, it is possible to select the best possible handover target cell from both the radio and transport network point of view and to avoid congestion in both networks.

Another advantage of the invention is that it makes it possible not only to quickly reduce data congestion in a congested situation, but it also enables load to be balanced between radio cells, thus making it possible to avoid congestion in advance.

Another advantage of the invention is that no new interface between the transport resource management unit and the radio resource management unit is needed. The radio resource management unit does not even have to be aware whether or not the network comprises a transport resource management unit.

LIST OF DRAWINGS

In the following, the invention will be described in greater detail with reference to the preferred embodiments and the accompanying drawings, in which.

DESCRIPTION OF EMBODIMENTS

Figure 1:
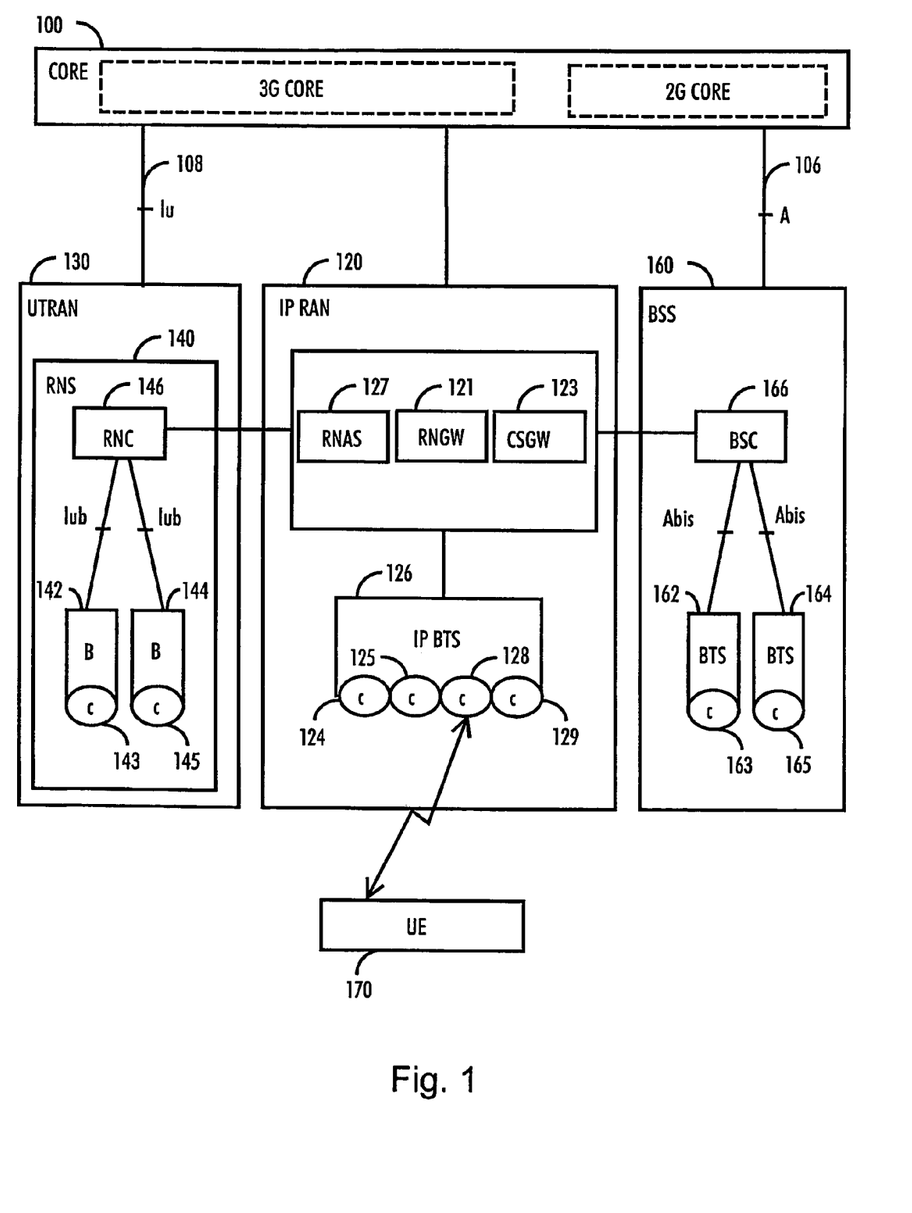
FIG. 1 shows an example of a radio system.

Referring to FIG. 1, a radio system is described as an example of a system to which embodiments of the invention can be applied. In FIG. 1, the embodiments are described in a simplified radio system, which comprises the main parts of a radio system: a core network (CN) 100, a radio access network 130, 120, 160, and user equipment (UE) 170.

FIG. 1 shows the general architecture of an evolutionary 3G radio system using different technologies and interoperation of different generations of radio access networks, wherein network elements from the second, 2.5 and third generations coexist. In the description, the radio system of the second generation is represented by the GSM (Global System for Mobile Communications), the 2.5 generation radio system by a radio system which is based on the GSM, and which uses the EDGE technique (Enhanced Data Rates for Global Evolution) for increasing the data transmission rate, and which can also be used for implementing packet transmission in the GPRS system (General Packet Radio System). The third generation radio system is represented by a radio system which is known at least by the names IMT-2000 (International Mobile Telecommunications 2000) and UMTS (Universal Mobile Telecommunications System).

The Base Station Subsystem (BSS) 160 based on the GSM consists of a base station controller (BSC) 166 and base transceiver stations (BTS) 162, 164. The base station controller 166 controls the base transceiver stations 162, 164. The interface 106 between the core network 100 and the BSS 160 is called A. The interface between the BSC 166 and BTS 162, 164 is called A-bis. In principle, the devices implementing the radio path and their functions should be located in the base transceiver station 162, 164 and the management devices in the base station controller 166. The implementation may naturally deviate from this principle.

The UMTS Radio Access Network (UTRAN) 130 consists of radio network subsystems 140. Each Radio Network Subsystem (RNS) 140 consists of radio network controllers (RNC) 146 and nodes B 142, 144. Node B is rather an abstract concept, which is frequently replaced by the term 'base station'. The interface between different radio network subsystems RNS 140 is called Iur. The interface 108 between the core network 100 and the UTRAN 130 is called Iu. The interface between the RNC 146 and node B 142, 144 is called Iub. In respect of its functionality, the radio network controller 146 approximately corresponds with the base station controller 166 of the GSM system and the node B 142, 144 to the base station 162, 164 of the GSM system. Solutions are also available where the same device functions both as the base station and as the node B, i.e. the device can simultaneously implement a TDMA (Time Division Multiple Access) and a WCDMA radio interface.

The radio system may use an IP technology based radio access network, i.e. an IP RAN (Internet Protocol Radio Access Network, IP Radio Access Network) 120. FIG. 1 shows the role of the IP RAN 120 in the radio system, using the IP RAN 120 as an example of a radio access network (RAN) to which the embodiments can be applied. The IP RAN 120 is a radio access network platform based on IP-technology also enabling interoperation with other, more conventional radio network access technologies and networks, such as the UTRAN (UMTS Radio Access Network), BSS (Base Station Subsystem) used in GSM (Global System for Mobile Communications) or GERAN (GSM EDGE Radio Access Network).

The IP RAN 120 can be briefly described with the following groups of entities described in FIG. 1: the IP base stations (IP BTS) 126, the IP RAN gateways, such as RNGW (Radio Access Network Gateway, RAN Gateway) 121; CSGW (Circuit Switched Gateway) 123 and RNAS (Radio Access Network Server, RAN Access Server) 127, and the IP RAN common servers, not illustrated in FIG. 1 for the sake of clarity. The IP RAN comprises also other elements, like routers, also not described in FIG. 1.

In IP RAN 120, most of the functions of the centralized controller (RNC 146 and BSC 166) are moved to the IP base station 126. In particular, all the radio interface protocols are terminated at the IP base station 126. Entities outside the IP base station 126 are needed for example to perform common configuration and some radio resource (RR) functions, or to interwork with conventional radio access networks or base station subsystems or gateways to the core network 100.

FIG. 1 also illustrates the coverage areas, i.e. cells, of the base stations of the different radio access networks. Cells 143 and 145 thus represent the coverage areas of nodes B 142 and 144, and cells 163 and 165 represent the coverage areas of the base stations 162 and 164. One node B 142, 144, or base station 162, 164 may either serve one cell, as illustrated in FIG. 1, or several cells which in the case of base stations, can be sectored cells. The coverage area of the IP base station (IP BTS) 126, is represented by multiple cells 124, 125, 128, 129 in the figure, but an IP BTS may also serve just one cell.

User equipment 170 illustrated in FIG. 1 is preferably applicable to both 2G and 3G systems, comprising at least one transceiver for establishing a radio connection to the radio access network 120. Typically, user equipment 170 is a mobile station, further comprising an antenna, a user interface and a battery. Nowadays various kinds of user equipment 170 are available, e.g. equipment installed in a car and portable equipment, and user equipment 170 can also have properties similar to those of a personal computer or a portable computer. User equipment 170 is connected to the radio system via the base stations of a radio access network, such as the IP RAN 120, for providing the user of the user equipment with access to the core network of the telecommunications system.

Figure 2:
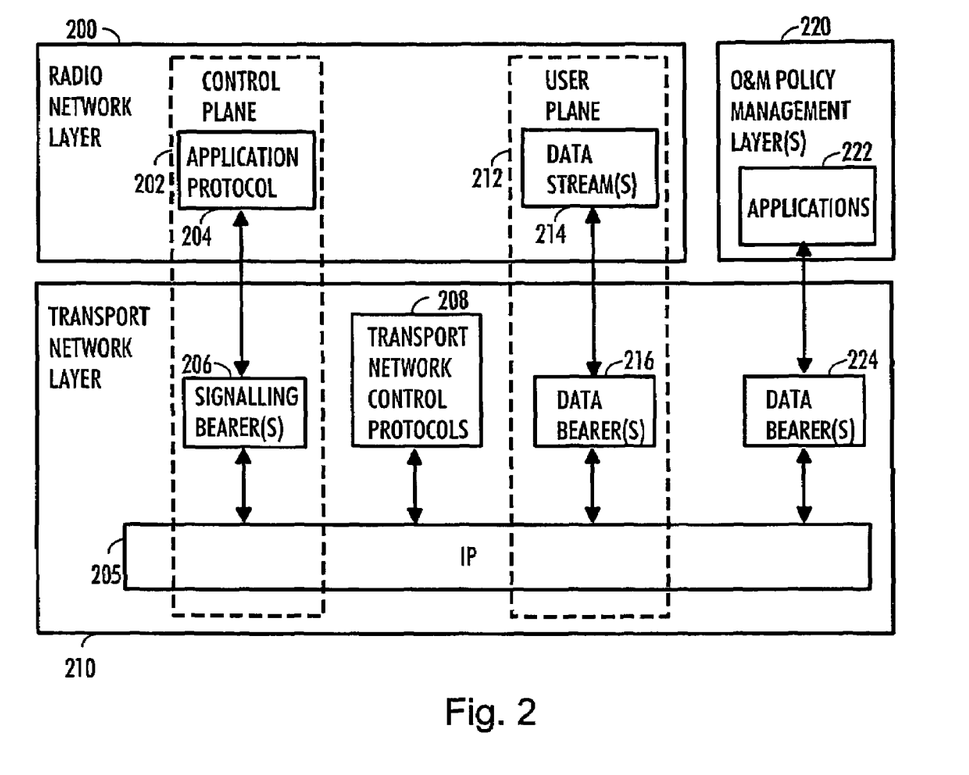
FIG. 2 shows an example of a general protocol model for a radio access system.

Referring to FIG. 2, a general protocol model for IP RAN is explained. As described in FIG. 2, IP RAN internal functions and protocols can be classified into three different layers: a Radio Network Layer (RNL) 200, a Transport Network Layer 210 and an Operation and Maintenance (O&M) and Policy Management Layer 220. A protocol stack diagram, as in FIG. 2, usually further comprises two planes, a Control Plane 202 and a User Plane 212. The application protocols 204 and the data streams 214 in the radio network layer 200 and the signalling bearers 206, transport network control protocols 208, data bearers 216, 224 and the IP layer 205 in the Transport Network Layer 210 and the applications 222 in the O&M and Policy Management Layer are also illustrated in FIG. 2. The control plane 202 transfers signalling information, and the user plane 212 transfers all information sent and received by the user. The Radio Network Layer 200 includes all the functions and protocols related to radio, i.e. RAN, or cellular specific protocols. The Transport Network Layer 210 represents standard transport technology that has been selected to be used for the IP RAN. In the IP RAN the transport network layer 210 has a wider scope than in the UTRAN, where it was intended only to provide the signalling bearer and the data bearer and control the setup of the user plane connection. The transport layer 210 is shared with the core network 100 (described in FIG. 1). The Operation and Maintenance and Policy Management Layer 220 takes care of the network operation and maintenance and network policy management. Each layer can be described in terms of logical entities. The physical architecture and physical network element may include more than one logical entity for each layer. Further information on radio telecommunications systems can be found in the literature and standards on the field.

Figure 3:
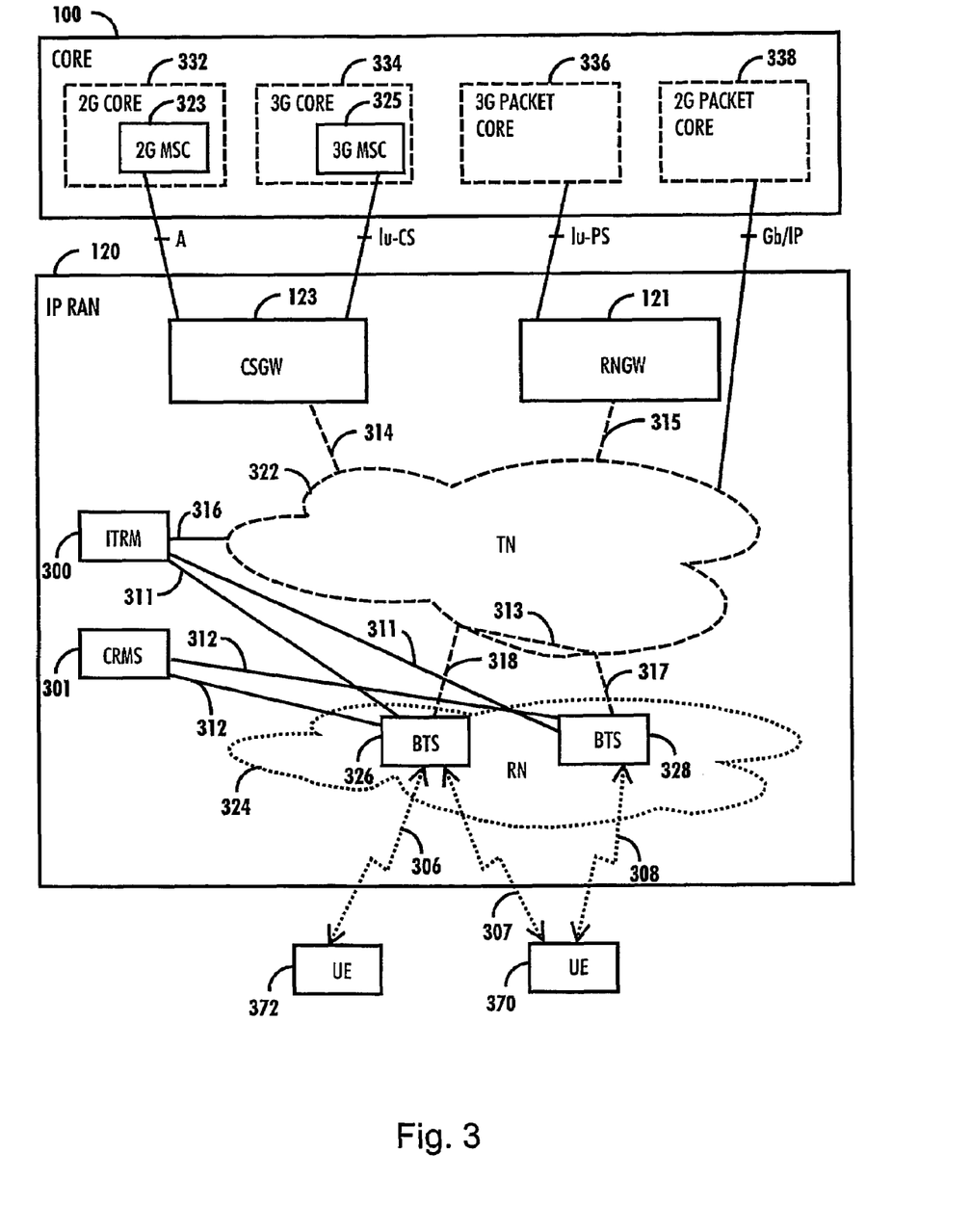
FIG. 3 shows another example of a radio system.

FIG. 3 illustrates a manner of managing radio resources in a radio system. The embodiment is described in a simplified radio system, using an IP RAN based system as an example. However, the embodiments are not restricted to these systems given as examples but a person skilled in the art may apply the solution to other radio systems or their combinations provided with the necessary properties.

The radio system of FIG. 3 comprises a radio access network (RAN), in this case an IP RAN 120, but the radio access network could also be some other packet switched network with a routing function. The radio system could also be, for example, a virtual private network (VPN).

The radio system comprises at least first user equipment 370. In FIG. 3, second user equipment 372 is also described. The IP RAN 120 of FIG. 3 comprises a radio network 324 and a transport network 322. The logical function of the radio network 324 is, as described in FIG. 1, to provide user equipment 170 with a radio cell 124, 125, 128, 129 for radio transmission and reception. The logical function of the transport network 322 is to provide the radio cell 124, 125, 128, 129 with a connection to the core network 100.

The radio network 324 comprises base stations (BTS) 326, 328 which, in this case, are IP base stations. The first base station 326 provides the first user equipment 370 with a radio connection 307 for providing it access to the radio system. The second user equipment 372 is also connected to the radio network 324 via the first base station 326 which provides radio connection 306 to user equipment 372.

In a radio system, the radio cells created by base stations usually overlap to some extent to provide extensive coverage. In the existing radio systems, wireless telecommunications connections are established by user equipment and base stations which communicate with each other on a radio connection, i.e. calls or data transmission connections between different user terminals are established via base stations. This is illustrated in FIG. 3 by radio connections 306, 307, 308. In particular, FIG. 3 shows a situation where user equipment 370, which may be mobile, communicates over a radio connection with the first base station 326, simultaneously measuring common pilots of this base station 326 and the second base station 328 for a possible handover. In a typical situation, the radio connection the user equipment shifts from the first base station to the second base station when there is free capacity in the new cell and the new connection has a better quality. Channel and cell handovers enable continuity of the radio connection when the user terminal moves or the physical radio channel changes as a function of time.

The core network 100 comprises core networks of different generations, such as a 2G core network 332, 3G core network 334, 3G packet core network 336 and 2G packet core network 338.

The IP RAN 120 also comprises radio access network gateways that are the access points to IP RAN from the core network and other radio access networks. The radio access network gateways are: a CSGW (circuit switched gateway, CS gateway) 123, an RNGW (radio access network gateway, RAN gateway) 121 and an RNAS (radio access network server, RAN access server) 127 (illustrated in FIG. 1). The transport network 322 is connected via a connection 314 to the CSGW 123 and via a connection 315 to the RNGW 121. In the example of FIG. 3, both connections 314 and 315 are implemented as IP connections, but their implementation is not, however, restricted to IP; other suitable techniques can also be used.

The 2G core network 332 comprises a 2G mobile station controller (2G MSC) 323 connected via interface A to the CSGW 123. The 3G core network 334 comprises a 3G mobile station controller (3G MSC) 325 connected via an lu-CS interface to the CSGW 123. The 3G packet core network 336 is connected via an lu-PS interface to the RNGW 121. The 2G packet core network 338 is connected via a Gp/IP interface to the transport network 322. The radio system of FIG. 3 also comprises a radio resource management unit 301 for managing the radio resources between the base stations and the user equipment in the radio network. The radio resource management unit 301 is configured to receive radio capacity information. The radio capacity information can be indicated as the cell load of the radio cell. In the example of FIG. 3, the radio resource management unit 301 is implemented by one of the RAN common servers, an entity called a common resource management server (CRMS). However, the implementation of the embodiment is not restricted to the CRMS but the radio resource management unit 301 could be any entity configured to receive radio capacity information on the radio network 324.

The radio system of FIG. 3 also comprises a transport resource management unit 300 for managing the transport network resources. The transport resource management unit 300 is configured to receive transport load information on the transport network 322 available to the radio cells. In the example of FIG. 3, the transport resource management unit 300 is implemented by an entity called an IP Transport Resource Manager (ITRM). The ITMR belongs to the transport network 322 logical architecture and it manages and monitors the resources across the access part of the IP transport network, but not the core network. The implementation of the embodiment is, however, not restricted to the ITRM but the transport resource management unit 300 could be any entity configured to measure the transport load of the transport network 322.

The transport resource management unit 300 receives measurements and reports indicating the transport capacity of the transport network. The transport capacity can be indicated as the transport load. Based on the transport capacity information the transport resource management unit 300 receives from the transport network 322, it is able to determine a traffic capacity limit for each radio cell 124, 125, 128, 129. The traffic capacity limit determined by the transport resource management unit 300 for each base station 326, 328 is an upper limit for user traffic to the gateways towards the core network. The traffic capacity limit can also be an upper limit for user traffic from a base station to other base stations, typically to the neighbouring base stations.

The transport resource management unit 300 signals the transport capacity limit of the radio cell to the respective base station.

The base station 326, 328 then adjusts the radio capacity information on the radio cell based on the transport capacity limit. The base station 326, 328 signals the adjusted radio capacity information to the radio resource management unit 301. The radio capacity information reflecting the cell load is thus adjusted to also reflect the transport load of the transport network.

The radio resource management unit 301 uses the adjusted radio capacity information for managing the radio resources, e.g. for re-arranging the handover lists.

The base station 326, 328 can use the transport capacity limit to adjust the available radio capacity of the radio cell. The base station 326, 328 can e.g. use the information when receiving a new access request, e.g. an incoming handover or initial access.

The radio resource management unit 301 is also capable of tuning cell access parameters in order to balance load between cells. The radio resource management unit 301 can now take the transport load of the transport network into account in autotuning, in addition to the load of the radio interface indicated in the radio capacity information the radio resource management unit 301 receives from the radio cells. Thus, it is possible to avoid congestion in the radio system in advance, in addition to reducing congestion in an already congested situation.

Let us use an example to further clarify the embodiment of FIG. 3. The transport resource management unit 300 is connected to the transport network 322 via a connection 316 and it receives information about transport capacity of the transport network, e.g. connections 313, 314, 315, 317, 318. The connections 314, 315 towards the CSGW 123 and RNGW 121, and the connections 317, 318 from the base stations 328, 326 are part of the transport network 322. Connections between base stations, e.g. the connections 318, 313, 317 between the BTS 326 and the BTS 328 also belong to the transport network 322. The radio resource management unit 301 receives information through a connection 312 about radio capacity of the BTS 326 and the BTS 328, reflecting the load of air interface, e.g. radio connections 307, 306 and 308. When high transport load is detected in the connection 313, 314, 315, 317 or 318, the transport resource management unit 300 commands, using a connection 311, the BTS 326 and the BTS 328 to reduce the capacity they may admit to users who request communication over the connection 318, 313, 317, 314 or 315. At the same time, the information the radio resource management unit 301 receives through the connection 312 from the BTS 326 or the BTS 328 is adjusted automatically to reflect the commands the BTS 326, 328 has received from the transport resource management unit 300. Now all the elements, the BTS 326, 328, the transport resource management unit 300 and the radio resource management unit 301 work according to consistent capacity information without any direct connection between the transport resource management unit 300 and the radio resource management unit 301. When the transport load in the connection 318, 313, 317, 314 or 315 decreases back to normal, the transport resource management unit 300 commands the BTS 326, 328 to put all air interface capacity to use; this is further automatically noticed in the radio resource management unit 301.

Thus, in the light of the example, the idea of the described embodiment lies in dynamically adjusting the radio capacity information, more specifically the radio capacity information on the radio cell that is reported to the radio resource management unit 301 and used by the BTS 326, 328 e.g. when a handover or access request arrives, based on the transport capacity limit reflecting the transport capacity and load situations in the transport network 322 e.g. from the anchor point of the handover to each base station.

The radio capacity information signalled from the BTS to the radio resource management unit can be indicated as the cell load of the radio cell. Typically it comprises parameters expressing information on the maximum available capacity of the cell and current load information expressed, for example, as a percentage of the maximum capacity. Alternatively, the radio capacity information may comprise a parameter reflecting the available radio capacity.

The disclosed functionalities can be implemented in the different parts of the radio system by means of software, usually as a processor and its software, but various hardware solutions are also feasible, e.g. a circuit built from logic components or one or more application specific integrated circuits ASIC. A hybrid of these different implementations is also feasible. When selecting the implementation method, a person skilled in the art will consider the requirements set on the size and power consumption of the device, the necessary processing capacity, the production costs and the production volumes. Referring to the flow chart of FIG. 4, a method for managing radio resources in a radio system is described. The radio resources are used for providing radio connections between user equipment and respective base stations of radio cells in a radio network of the radio system.

Figure 4:
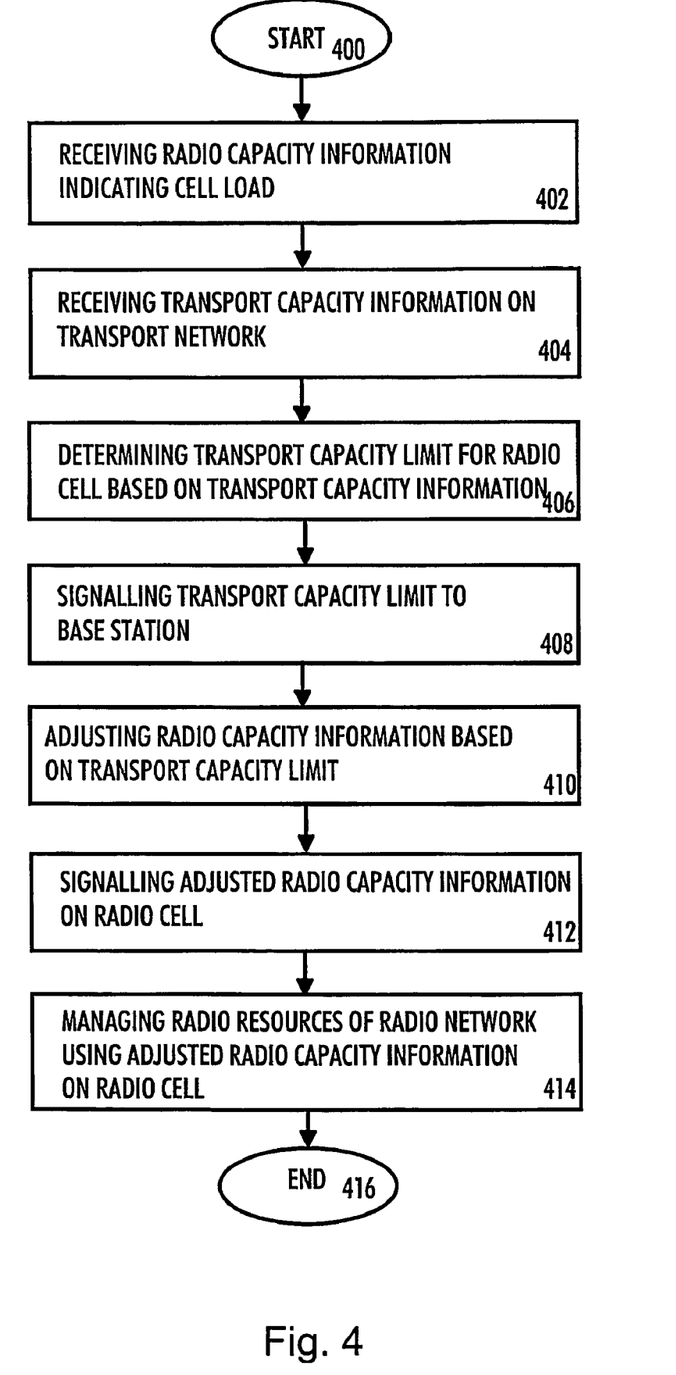
FIG. 4 is a flow chart illustrating a method for managing radio resources in a radio system.

The method starts in 400. In 402 radio capacity information indicating the cell load of the radio cells available to user equipment is received.

In 404 transport capacity information on the transport network available to radio cells is received, the transport network being used for connecting the base stations of the radio network to a core network.

In 406 a transport capacity limit for a radio cell is determined based on the transport capacity information.

In 408 the transport capacity limit of the radio cell is signalled to the respective base station of the radio cell.

In 410 the radio capacity information is adjusted in the base station based on the received transport capacity limit.

In 412 the adjusted radio capacity information of the radio cell is signalled from the base station to be used in managing radio resources of a radio network.

In 414 the radio resources of a radio network are managed by using the signalled adjusted radio capacity information on the radio cell.

The method ends in 416.

The disclosed method can be implemented by the previously disclosed radio system but also other kind of radio systems can be used.

According to the method, the available radio capacity of the radio cell can be adjusted based on the received transport capacity limit.

In the method, the radio capacity information can be indicated as the cell load of the radio cell. The transport capacity information can be indicated as the transport load of the transport network.

In an embodiment of the method, the radio capacity information indicates the current and the maximum cell load of the radio cell.

In another embodiment of the method, the radio capacity information indicates the current cell load and the available radio capacity of the radio cell.

In an embodiment of the method, the transport capacity information indicates the transport load of a connection from one base station of the radio network to another base station of the radio network.

In an embodiment of the method, the adjusted radio capacity information of the radio cell is signalled from the base station to a radio resource management unit to be used in managing radio resources. In an embodiment, the adjusted radio capacity information of the radio cell is signalled from the base station to a Common Radio Resource Management Server.

In an embodiment of the method, the transport capacity limit of a radio cell is determined in a transport resource management unit. In an embodiment, the transport capacity limit of a radio cell is determined in an Internet Protocol Transport Resource Manager.

In an embodiment of the method, a handover list is organized based on the adjusted radio capacity information of the radio cells.

In an embodiment of the method, the adjusted radio capacity information on the radio cells is used when handling base station admission requests.

In an embodiment of the method, the adjusted radio capacity information of the radio cells is used when handling handover requests.

Although the invention has been described above with reference to an example according to the accompanying drawings, it is obvious that the invention is not restricted thereto but can be varied in many ways within the inventive idea disclosed in the accompanying claims.

The invention claimed is:

1. A method for managing radio resources in a radio system, the radio resources being used for providing a radio connection between user equipment and a radio cell of a base station in a radio network of the radio system, the method comprising:
   receiving radio capacity information on the radio cell,
   receiving transport capacity information on a transport network, the transport network being used for connecting the base stations of the radio network to a core network, comprising:
   determining a transport capacity limit for the radio cell based on the transport capacity information;
   signalling the transport capacity limit of the radio cell to the base station;
   adjusting, in the base station, the radio capacity information based on the transport capacity limit;
   signalling from the base station the adjusted radio capacity information on the radio cell;
   managing radio resources of the radio network by using the signalled adjusted radio capacity information on the radio cell.

2. The method of claim 1, further comprising adjusting the available radio capacity of the radio cell based on the received transport capacity limit.

3. The method of claim 1, wherein the radio capacity information indicates at least one element selected from a group comprising: the current cell load and the maximum radio capacity of the radio cell, the current cell load and the available radio capacity of the radio cell, the transport load of the transport network, the transport load of a connection from one base station of the radio network to another base station of the radio network.

4. The method of claim 1, further comprising signalling the adjusted radio capacity information on the radio cell from the base station to a radio resource management unit to be used in managing radio resources.

5. The method of claim 1, further comprising signalling the adjusted radio capacity information on the radio cell from the base station to a Common Radio Resource Management Server to be used in managing radio resources.

6. The method of claim 1, further comprising determining the transport capacity limit of a radio cell in a transport resource management unit.

7. The method of claim 1, further comprising determining the transport capacity limit of a radio cell in an Internet Protocol Transport Resource Manager.

8. The method of claim 1, further comprising organizing a handover list based on the adjusted radio capacity information on the radio cell.

9. The method of claim 1, wherein the adjusted radio capacity information on the radio cell is used when handling base station admission requests.

10. The method of claim 1, wherein the adjusted radio capacity information on the radio cell is used when handling handover requests.

11. A radio system, comprising:
- at least one radio network, the radio network comprising at least one base station for providing user equipment with a radio cell for radio transmission and reception;
- a transport network for providing the base stations of the radio network with a connection to a core network of the radio system;
- a radio resource management unit for managing the radio resources between the base stations and the user equipment in the radio network, configured to receive radio capacity information on the radio cell;
- a transport resource management unit (300) for managing the transport network resources, configured to receive transport capacity information on the transport network;
- wherein
- the transport resource management unit is configured to determine a transport capacity limit for a radio cell based on the transport capacity information;
- wherein the transport resource management unit is configured to signal the transport capacity limit of the radio cell to the base station;
- wherein the base station is configured to adjust the radio capacity information on the radio cell based on the transport capacity limit;
- wherein the base station is configured to signal the adjusted radio capacity information on the radio cell to the radio resource management unit to be used in managing radio resources ; and
- wherein the radio resource management unit is configured to manage radio resources of the radio network by using the signalled adjusted radio capacity information on the radio cell.

12. The system of claim 11, wherein the available radio capacity of the radio cell is adjusted based on the received transport capacity limit.

13. The system of claim 11, wherein the radio capacity information indicates at least one element selected from a group comprising: the current cell load and the maximum radio capacity of the radio cell, the current cell load and the available radio capacity of the radio cell, the transport load of the transport network, the transport load of a connection from one base station of the radio network to another base station of the radio network.

14. The system of claim 11, wherein the base station is configured to signal the adjusted radio capacity information on the radio cell to a Common Radio Resource Management Server to be used in managing radio resources.

15. The system of claim 11, wherein a handover list is organized based on the adjusted radio capacity information on the radio cell.

16. The system of claim 11, wherein the adjusted radio capacity information on the radio cell is used when handling base station admission requests.

17. The system of claim 11, wherein the adjusted radio capacity information on the radio cell is used when handling handover requests.

18. The system of claim 11, wherein the base station is configured to adjust the available radio capacity of the radio cell based on the transport capacity limit.

19. The system of claim 11, wherein the transport resource management unit is an Internet Protocol Transport Resource Manager.

20. The system of claim 11, wherein the radio resource management unit is a Common Radio Resources Management Server.

21. The system of claim 11, wherein the radio resource management unit is configured to organize a handover list based on the adjusted radio capacity information on the radio cell.

22. A transport resource management unit for, managing the transport network resources and for receiving transport capacity information on the transport network in a radio system, which comprises at least one base station for providing user equipment with a radio cell for radio transmission and reception and a radio resource management unit for managing the radio resources between the base station and the user equipment and configured to receive radio capacity information on the radio cell, wherein the transport resource management unit is configured to determine a transport capacity limit for a radio cell based on the transport capacity information and to signal the transport capacity limit to the base station for the adjustment of the radio capacity information based on the transport capacity limit and for signalling the adjusted radio capacity information to the radio resource management unit for managing radio resources of the radio network by using the signalled adjusted radio capacity information.

23. A radio resource management unit for managing radio resources between base stations and user equipment in a radio network of a radio system, the radio resource management unit being configured to receive radio capacity information on the radio cell, wherein the radio resource management unit is configured to manage radio resources of the radio network by using signalled adjusted radio capacity information on the radio cell, the signalled adjusted radio capacity information being signalled from a base station and being adjusted based on a transport capacity limit determined based on the transport capacity information on the transport network of the radio system.

24. A base station of a radio system for providing user equipment with a radio cell for radio transmission and reception in a radio system which comprises a transport network for providing the base station with a connection to a core network of the radio system, a radio resource management unit for managing the radio resources between the base station and the user equipment, a radio resource management unit configured to receive radio capacity information on the radio cell, the radio system further comprising a transport resource management unit for managing the transport network resources and configured to receive transport capacity information on the transport network, wherein the base station is configured to adjust the radio capacity information on the radio cell based on the transport capacity limit determined based on the transport capacity information and signalled from the transport resource management unit; and
- wherein the base station is configured to signal the adjusted radio capacity information on the radio cell to the radio resource management unit for managing the radio resources by using the adjusted radio capacity information.

25. The base station of claim 24, wherein the base station comprises the radio resource management unit.

26. The base station of claim 24, wherein the base station comprises the transport resource management unit.

27. A base station for providing user equipment with a radio cell for radio transmission and reception, comprising:
   a radio resource management unit for managing the radio resources between the base station and the user equipment in the radio network, the radio resource management unit being configured to receive radio capacity information on the radio cell;
   a transport resource management unit for managing transport network resources, configured to receive transport capacity information on the transport network,
   wherein the transport resource management unit is configured to determine a transport capacity limit for a radio cell based on the transport capacity information;
   wherein the transport resource management unit is configured to signal the transport capacity limit of the radio cell to the base station;
   wherein the base station is configured to adjust the radio capacity information on the radio cell based on the transport capacity limit;
   wherein the base station is configured to signal the adjusted radio capacity information on the radio cell to the radio resource management unit to be used in managing radio resources; and
   wherein the radio resource management unit is configured to manage radio resources of the radio network by using the signalled adjusted radio capacity information on the radio cell.

* * * * *

UNITED STATES PATENT AND TRADEMARK OFFICE
CERTIFICATE OF CORRECTION

PATENT NO. : 7,305,241 B2
APPLICATION NO. : 10/528080
DATED : December 4, 2007
INVENTOR(S) : Heikki Hirvonen et al.

It is certified that error appears in the above-identified patent and that said Letters Patent is hereby corrected as shown below:

In column 10, line 33, change "the base stations" to --base stations--.
In column 10, lines 46 and 47, change "the available" to --available--.
In column 10, line 51, change "the current" to --a current--.
In column 10, line 51, change "the maximum" to --a maximum--.
In column 10, line 52, change "and the" to --and an--.
In column 10, line 53, change "the transport" to --a transport--.

In column 11, line 17, change "the base stations" to --the at least one base station--.
In column 11, line 19, change "the radio" to --a radio--.
In column 11, line 21, change "the base stations" to --the at least one base station--.
In column 11, line 24, change "unit (300)" to --unit--.
In column 11, line 25, change "the transport" to --transport--.
In column 11, line 30, change "a radio" to --the radio--.
In column 11, line 34, change "the base" to --the at least one base--.
In column 11, line 35, change "the base" to --the at least one base--.
In column 11, line 38, change "the base" to --the at least one base--.
In column 11, line 41, change "resources ; and" to --resources; and--.
In column 11, line 43, change "manage radio" to --manage the radio--.
In column 11, line 46, change "the available" to --available--.
In column 11, line 51, change "the current" to --a current--.
In column 11, line 51, change "the maximum" to --a maximum--.
In column 11, line 52, change "and the" to --and--.
In column 11, line 53, change "the transport" to --a transport--.

In column 12, line 18, change "the transport" to --a transport--.
In column 12, line 19, change "the transport" to --a transport--.
In column 12, line 23, change "the radio" to --radio--.
In column 12, line 27, change "a radio" to --the radio--.
In column 12, line 29, change "for the" to --for an--.
In column 12, line 33, change "the radio" to --a radio--.
In column 12, line 39, change "the radio" to --a radio--.

Signed and Sealed this

Twenty-first Day of December, 2010

David J. Kappos
*Director of the United States Patent and Trademark Office*

CERTIFICATE OF CORRECTION (continued)
U.S. Pat. No. 7,305,241 B2

In column 12, line 45, change "the transport" to --a transport--.
In column 12, line 45, change "on the" to --on a--.
In column 12, line 52, change "the radio" to --a radio--.
In column 12, lines 53 and 54, change "a radio resource management unit" to --and--.
In column 12, line 56, change "managing the" to --managing--.
In column 12, line 60, change "based on the" to --based on a--.

In column 13, line 7, change "the radio" to --radio--.
In column 13, line 14, change "on the" to --on a--.
In column 13, line 16, change "for a" to --for the--.

In column 14, line 7, change "the." to --the--.
In column 14, line 10, change "managing radio" to --managing the radio--.
In column 14, line 12, change "managing radio" to --managing the radio--.